United States Patent
Goddard et al.

(10) Patent No.: US 9,441,995 B2
(45) Date of Patent: Sep. 13, 2016

(54) SYSTEM AND METHOD FOR MONITORING A BI-PHASE FLUID

(75) Inventors: Brian Goddard, Sugar Land, TX (US); Wakova Carter, Houston, TX (US); Brian Eldredge, Missouri City, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 322 days.

(21) Appl. No.: 12/641,380

(22) Filed: Dec. 18, 2009

(65) Prior Publication Data

US 2011/0153229 A1 Jun. 23, 2011

(51) Int. Cl.
*G01N 11/00* (2006.01)
*G01F 1/74* (2006.01)
*G01F 1/05* (2006.01)
*G01F 1/84* (2006.01)
*G01F 15/02* (2006.01)

(52) U.S. Cl.
CPC . *G01F 1/74* (2013.01); *G01F 1/05* (2013.01); *G01F 1/84* (2013.01); *G01F 15/024* (2013.01)

(58) Field of Classification Search
USPC ......... 702/6, 12, 16, 45, 47, 48, 50, 98, 99, 702/100
See application file for complete search history.

(56) References Cited

U.S. PATENT DOCUMENTS

| | | | | |
|---|---|---|---|---|
| 4,797,003 A | * | 1/1989 | Cameron et al. | 366/101 |
| 5,051,922 A | | 9/1991 | Toral et al. | |
| 5,480,597 A | * | 1/1996 | Ishida et al. | 264/40.4 |
| 5,535,632 A | * | 7/1996 | Kolpak | 73/861.04 |
| 5,861,755 A | | 1/1999 | Moerk et al. | |
| 6,857,323 B1 | | 2/2005 | Shajji et al. | |
| 2005/0229716 A1 | * | 10/2005 | Unsworth et al. | 73/861.53 |
| 2006/0096388 A1 | * | 5/2006 | Gysling et al. | 73/861.03 |
| 2007/0289357 A1 | * | 12/2007 | Mattar et al. | 73/1.16 |
| 2009/0139345 A1 | * | 6/2009 | Xie | 73/861.04 |
| 2009/0308601 A1 | | 12/2009 | Poe, Jr. | |

* cited by examiner

*Primary Examiner* — Paul D Lee
(74) *Attorney, Agent, or Firm* — Andrea E. Tran; Tim Curington

(57) ABSTRACT

A measurement system and method of use include a fluid conduit for routing a base fluid therethrough, a gas conduit in fluid communication with the fluid conduit for mixing a gas into the base fluid to form a foamed bi-phase fluid, a foam conduit in fluid communication with the fluid conduit and the gas conduit to receive the bi-phase fluid therein, a first sensor disposed to measure a characteristic of the base fluid in the fluid conduit, a second sensor disposed to measure a characteristic of the gas in the gas conduit, a third sensor disposed to measure a characteristic of the bi-phase fluid in the foam conduit, and a processor for receiving data representing the measurement from at least one of the first sensor, the second sensor, and the third sensor, analyzing the data, and calculating a parameter of the bi-phase fluid based upon the data.

20 Claims, 1 Drawing Sheet

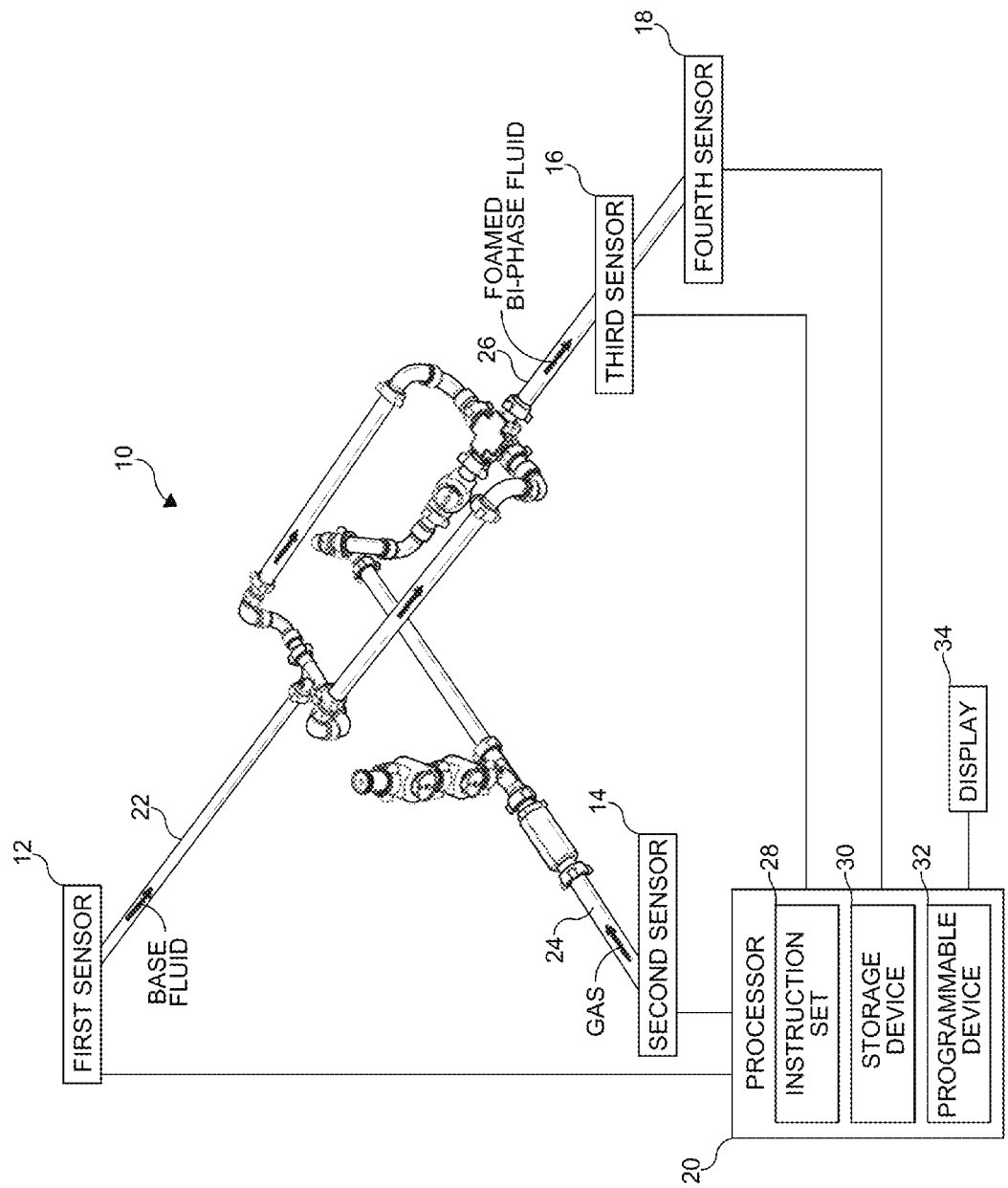

SYSTEM AND METHOD FOR MONITORING A BI-PHASE FLUID

BACKGROUND OF THE INVENTION

The statements in this section merely provide background information related to the present disclosure and may not constitute prior art.

The present invention relates generally to oil wells and, in particular, to a measurement system and a method for monitoring a bi-phase fluid.

In oil field well servicing applications, fluids can be foamed to create a lightweight dual phase system (i.e. bi-phase fluid) consisting of both gas and liquid phases. The dual phase system can be injected into an oil well at pressures exceeding 5000 psi. There are currently no non-radioactive sensors on the market that can measure characteristics of the dual phase system such as a foam quality, a foam rate, and/or a foam density under the exposed conditions.

Monitoring the foam quality, the foam density, and the foam rate is beneficial to ensure that a given operation is being performed as designed, identify inconsistencies in the operation and to ensure that all parameters are maintained within the operating envelope of the associated equipment.

The foam quality, the foam density, and the foam rate can typically be calculated based on measurements of several parameters. This requires all necessary parameters to be identified and a calculation made to determine the foam quality, density and rate at a given pressure and temperature.

Due to the complexity of the calculations and the necessary parameters required to make the calculation, the current processes do not provide a timely foam quality, foam density and/or foam rate that would allow for the immediate identification of an inconsistency in the operation.

It is always desirable to provide a real-time calculation of at least one of a foam quality, a foam density, and a foam rate, thereby allowing for a substantially immediate identification of any inconsistencies which can affect the overall quality of an operation.

SUMMARY OF THE INVENTION

An embodiment of a measurement system includes a fluid conduit for routing a base fluid therethrough, a gas conduit in fluid communication with the fluid conduit for mixing a gas into the base fluid to form a foamed bi-phase fluid, a foam conduit in fluid communication with the fluid conduit and the gas conduit to receive the bi-phase fluid therein, a first sensor disposed to measure a characteristic of the base fluid in the fluid conduit, a second sensor disposed to measure a characteristic of the gas in the gas conduit, a third sensor disposed to measure a characteristic of the bi-phase fluid in the foam conduit, and a processor for receiving data representing the measurement from at least one of the first sensor, the second sensor, and the third sensor, analyzing the data, and calculating a parameter of the bi-phase fluid based upon the data.

Another embodiment of a measurement system for monitoring a bi-phase fluid includes a fluid conduit for routing a base fluid therethrough, a gas conduit in fluid communication with the fluid conduit for injecting a gas into the base fluid to form the bi-phase fluid, a foam conduit in fluid communication with the fluid conduit and the gas conduit to receive the bi-phase fluid therein, a first sensor disposed to measure at least one of a density and a flow rate of the base fluid in the fluid conduit, a second sensor disposed to measure a flow rate of the gas in the gas conduit, a third sensor disposed to measure at least one of a pressure and a temperature of the bi-phase fluid in the foam conduit, and a processor for receiving data representing a measurement from at least one of the first sensor, the second sensor, and the third sensor, analyzing the data, and calculating a parameter of the bi-phase fluid based upon the data.

In an embodiment, a method for monitoring a bi-phase fluid comprises the steps of: providing a base fluid; mixing a gas into the base fluid to form a bi-phase fluid; providing a first sensor to measure a characteristic of the base fluid; providing a second sensor to measure a characteristic of the gas; providing a third sensor to measure a characteristic of the bi-phase fluid; and providing a processor to calculate an unknown parameter of the bi-phase fluid based upon at least one of the characteristic of the base fluid, the characteristic of the gas, and the characteristic of the bi-phase fluid.

BRIEF DESCRIPTION OF THE DRAWINGS

These and other features and advantages of the present invention will be better understood by reference to the following detailed description when considered in conjunction with the accompanying drawing, which is a schematic representation of a measurement system according to an embodiment of the present invention.

DETAILED DESCRIPTION OF THE INVENTION

Referring now to the drawing, there is shown an embodiment of a measurement system, indicated generally at 10. The measurement system 10 includes a plurality of sensors 12, 14, 16, 18 in data communication with a processor 20. In the embodiment shown, the measurement system 10 is disposed to monitor characteristics of materials flowing through a plurality of conduits 22, 24, 26 in fluid communication with each other (e.g. conduits used in an oil well servicing application).

The first sensor 12 is disposed adjacent the fluid conduit 22 to measure at least one of a flow rate and a density of a base fluid flowing therethrough. In certain embodiments, the base fluid includes at least one of a slurry (e.g. cement) and a foamer including, but not limited to, an additive, a stabilizing agent, and combinations thereof. As a non-limiting example, the first sensor 12 may be a coriolis flow meter. However, it is understood that any sensor capable of measuring at least one of a flow rate and a density of a fluid can be used. It is further understood that any number of sensors can be used. The base fluid may comprise a fluid liquid, a solid, a gas, and combinations thereof, as will be appreciated by those skilled in the art.

The second sensor 14 is disposed adjacent the gas conduit 24 to measure at least a flow rate of a gas flowing therethrough. As a non-limiting example, the second sensor 14 is a turbine flow meter. As a further example, the second sensor 14 may be a nitrogen turbine flow meter manufactured by Hoffer Flow Controls, Inc. It is understood that any sensor capable of measuring a flow rate of a gas can be used. It is further understood that any number of sensors can be used. In an embodiment, the second sensor 14 may further comprise a temperature sensor and a pressure sensor in order to calculate the density of the gas flowing in the gas conduit 24.

The third sensor 16 is disposed adjacent the foam conduit 26 to measure at least a pressure therein. As a non-limiting example, the third sensor 16 is a pressure transducer. As a further example, the third sensor 16 may be a 509 series oil field pressure transmitter manufactured by Viatran Corporation. It is understood that any sensor capable of measuring a pressure in the foam conduit 26 can be used. It is further understood that any number of sensors can be used.

The fourth sensor 18 is disposed adjacent the foam conduit 26 to measure at least a temperature of a foamed bi-phase fluid flowing therein. As a non-limiting example, the fourth sensor 18 is a PT100 sensor manufactured by WIKA Instrument Corporation. It is understood that any sensor capable of measuring a temperature of a bi-phase fluid can be used. It is further understood that any number of sensors can be used.

The processor 20 is in data communication with each of the sensors 12, 14, 16, 18 to receive data therefrom. In certain embodiments the data represents a characteristic of the materials flowing through the conduits 22, 24, 26 such as a flow rate, a density, a temperature, and a pressure, for example. The processor 20 may be any device or system adapted to receive data from at least one of the sensors 12, 14, 16, 18, analyze the received data, and calculate at least one parameter of the materials flowing through the conduits 22, 24, 26. In certain embodiments, the processor 20 is adapted to calculate at least one of a quality, a density, a flow rate, and a velocity of the bi-phase fluid flowing through the foam conduit 26. It is understood that the processor 20 may be in communication with any number of sensors and devices to receive data representing various parameters of the materials flowing through the conduits 22, 24, 26.

As shown, the processor 20 analyzes and evaluates the data based upon an instruction set 28. The instruction set 28, which may be embodied within any computer readable medium, includes processor executable instructions for configuring the processor 20 to perform a variety of tasks and calculations. It is understood that the instruction set 28 may include at least one of an algorithm, a mathematical process, and an equation for calculating a parameter of the materials flowing in the conduits 22, 24, 26. It is further understood that the processor 20 may execute a variety of functions such as controlling the functions of the sensors 12, 14, 16, 18 for example.

In certain embodiments, the processor 20 includes a storage device 30. The storage device 30 may be a single storage device or may be multiple storage devices. Furthermore, the storage device 30 may be a solid state storage system, a magnetic storage system, an optical storage system or any other suitable storage system or device. It is understood that the storage device 30 is adapted to store the instruction set 28. Other data and information may be stored in the storage device 30 such as the parameters calculated by the processor 20, for example. It is further understood that certain known parameters may be stored in the storage device 30 to be retrieved by the processor 20.

The processor 20 may further include a programmable device or component 32. It is understood that the programmable component 32 may be in communication with any other component of the measurement system 10 such as the sensors 12, 14, 16, 18, for example. In certain embodiments, the programmable component 32 is adapted to manage and control processing functions of the processor 20. Specifically, the programmable component 32 is adapted to control the analysis of the data received by the processor 20. It is understood that the programmable component 32 may be adapted to manage and control the sensors 12, 14, 16, 18. It is further understood that the programmable component 32 may be adapted to store data and information in the storage device 30, and retrieve data and information from the storage device 30. As a non-limiting example, the programmable component 32 is a human-machine interface for receiving user-provided inputs to control the function of at least one of the processor 20 and the sensors 12, 14, 16, 18. However, other devices can be controlled by the programmable component 32 such as a valve in the system 10, for example.

In operation, a base fluid is caused to flow through the fluid conduit 22 while a gas is caused to flow through the gas conduit 24. The gas is combined with the base fluid to form a foamed bi-phase fluid routed through the foam conduit 26. The sensors 12, 14, 16, 18 measure characteristics of the base fluid, the gas, and the foamed bi-phase fluid, as they pass through the respective conduits 22, 24, 26. Each of the sensors 12, 14, 16, 18 transmits data representing the measured characteristics to the processor 20. The processor 20 receives the data and uses the measured characteristics to calculate an unknown parameter of the foamed bi-phase fluid. Specifically, based on the measured pressure and temperature from the third sensor 16 and the fourth sensor 18 respectively, the measured characteristics of the fluid in the fluid conduit 22 received from the first sensor 12, the measured characteristics of the gas in the gas conduit 24 received from the second sensor 14, and other known parameters, at least one of the quality, the density, the flow rate, and the velocity of the bi-phase fluid can be calculated at conditions present in the foam conduit 26. In certain embodiments the calculated parameter of the bi-phase fluid is at least one of presented on a display 34 connected to the processor 20 and stored in the storage device 30.

As a non-limiting example, a foam quality (FQ) of the bi-phase fluid can be calculated from the flow rate of the gas ($V_{gas}$), a flow rate of the foamer ($V_{foamer}$), and a flow rate of the slurry ($V_{slurry}$). The flow rate of the gas ($V_{gas}$) and the flow rate of the foamer ($V_{foamer}$) are first converted to units of barrels per minute. If a measurement of the flow rate of the slurry ($V_{slurry}$) does not inherently include the flow rate of the foamer ($V_{foamer}$), the foam quality (FQ) is calculated as follows:

$$FQ = \frac{\dot{V}_{gas}}{\dot{V}_{gas} + \dot{V}_{Foamer} + \dot{V}_{slurry}} \times 100$$

If the measurement of the flow rate of the slurry ($V_{slurry}$) includes the flow rate of the foamer ($V_{foamer}$), the foam quality (FQ) is calculated as follows:

$$FQ = \frac{\dot{V}_{gas}}{\dot{V}_{gas} + \dot{V}_{slurry}} \times 100$$

In certain embodiments, an input from the programmable component 32 determines which equation is used. It is understood that the foam quality (FQ) is set to zero when the rates in the denominator sum to zero. It is further understood that the variable representing the flow rate of the slurry ($V_{slurry}$) can be replaced by a measurement of the flow rate of the base fluid ($V_{base}$) including any fluids, mixtures, or additives.

As a further example, a foam density of the foamed bi-phase fluid ($\rho_{foam}$) can be calculated by the processor 20. Initially, the flow rate of the gas ($V_{gas}$) and the flow rate of the foamer ($V_{foamer}$) are converted to units of barrels per minute. A density of the gas ($\rho_{gas}$) is then calculated at the pressure and temperature conditions in the foam conduit 26 or the gas conduit 24. If a measurement of the flow rate of the slurry ($V_{slurry}$) does not inherently include the flow rate of the foamer ($V_{foamer}$), a density of the base fluid ($\rho_{base}$) is calculated as follows:

$$\rho_{Base} = \frac{\rho_{Foamer} \dot{V}_{Foamer} + \rho_{Slur} \dot{V}_{Slurry}}{\dot{V}_{Foamer} + \dot{V}_{Slurry}}$$

If the measurement of the flow rate of the slurry ($V_{slurry}$) includes the flow rate of the foamer ($V_{foamer}$), the density of the base fluid ($\rho_{base}$) is calculated as follows:

$$\rho_{Base} = \frac{\rho_{Foamer} \dot{V}_{Foamer} + \rho_{Slurry}(\dot{V}_{Slurry} - \dot{V}_{Foamer})}{\dot{V}_{Foamer} + (\dot{V}_{Slurry} - \dot{V}_{Foamer})}$$

In certain embodiments, an input from the programmable component 32 determines which equation is used. Finally, the density of the foamed bi-phase fluid ($\rho_{foam}$) at surface conditions is calculated from the following equation:

$$\rho_{Foam} = \rho_{Base} - \left(\frac{FQ}{100}\right)(\rho_{Base} - \rho_{gas})$$

When the flow rate of the foamer ($V_{foamer}$) and the flow rate of the slurry ($V_{slurry}$) are near zero, the density of the base fluid ($\rho_{base}$) is set to zero. In this case, the foam quality (FQ) will be 100% and the density of the bi-phase fluid ($\rho_{foam}$) will be the density of the gas ($\rho_{gas}$).

As yet a further example, a flow rate of the foamed bi-phase fluid ($V_{foam}$) can be calculated by the processor 20. The flow rate of the gas ($V_{gas}$) and the flow rate of the foamer ($V_{foamer}$) are first converted to barrels per minute, or any suitable unit. All of the rates coming into the foam conduit 26 are summed to find the flow rate of the foamed bi-phase fluid ($V_{foam}$) therein. If the flow rate of the slurry ($V_{slurry}$) inherently includes the flow rate of the foamer ($V_{foamer}$), the flow rate of the foamed bi-phase fluid ($V_{foam}$) is calculated as follows:

$$\dot{V}_{Foam} = \dot{V}_{Slurry} + \dot{V}_{gas}$$

If the measurement of the flow rate of the slurry ($V_{slurry}$) does not include the flow rate of the foamer ($V_{foamer}$), the flow rate of the foamed bi-phase fluid ($V_{foam}$) is calculated as follows:

$$\dot{V}_{Foam} = \dot{V}_{Slurry} + \dot{V}_{gas} + \dot{V}_{Foamer}$$

The present invention provides a system and method for utilizing existing off the shelf sensors to acquire data necessary to calculate the foam quality, the foam density and the foam rate via a central processing unit (i.e. processor 20) in substantially real-time.

The real-time calculations of the foam quality, foam density, and foam rate allow for immediate identification of inconsistencies which can affect the overall quality of an operation.

The preceding description has been presented with reference to presently preferred embodiments of the invention. Persons skilled in the art and technology to which this invention pertains will appreciate that alterations and changes in the described structures and methods of operation can be practiced without meaningfully departing from the principle, and scope of this invention. Accordingly, the foregoing description should not be read as pertaining only to the precise structures described and shown in the accompanying drawings, but rather should be read as consistent with and as support for the following claims, which are to have their fullest and fairest scope.

We claim:

1. A measurement system, comprising:
    a plurality of nonlinear fluid conduits connected upstream to a common fluid conduit for routing a base fluid therethrough;
    a gas conduit in direct fluid communication with each of the nonlinear fluid conduits for mixing a gas into the base fluid to form a foamed bi-phase fluid;
    a foam conduit in fluid communication with the nonlinear fluid conduits and the gas conduit to receive the bi-phase fluid therein;
    a first sensor disposed to measure a characteristic of the base fluid in the common and nonlinear fluid conduits;
    a second sensor disposed to measure a characteristic of the gas in the gas conduit;
    a third sensor disposed to measure at least one of a pressure and a temperature of the bi-phase fluid in the foam conduit; and
    a processor in communication with at least one of the first sensor, the second sensor, and the third sensor, for determining a quality of the bi-phase fluid.

2. The measurement system according to claim 1, wherein the first sensor is a coriolis flow meter.

3. The measurement system according to claim 1, wherein the second sensor is a turbine flow meter.

4. The measurement system according to claim 1, wherein the third sensor is a pressure transducer.

5. The measurement system according to claim 4, further comprising a fourth sensor disposed to measure the temperature of the bi-phase fluid in the foam conduit, wherein the fourth sensor is a temperature sensor.

6. The measurement system according to claim 1, wherein the third sensor is a temperature sensor.

7. The measurement system according to claim 1, wherein at least one of a density, a flow rate, and a velocity of the bi-phase fluid is determined by the processor.

8. The measurement system according to claim 1, wherein the determining by the processor is based upon an instruction set.

9. The measurement system according to claim 1, further comprising a storage device connected to the processor for storing the quality of the bi-phase fluid determined by the processor.

10. The measurement system according to claim 1, further comprising a display connected to the processor for visually presenting the quality of the bi-phase fluid determined by the processor to a user.

11. A measurement system for monitoring a bi-phase fluid in an oil well servicing application, comprising:
    a plurality of nonlinear fluid conduits connected upstream to a common fluid conduit for routing a base fluid therethrough;
    a gas conduit in direct fluid communication with each of the nonlinear fluid conduits for injecting a gas into the base fluid to form the bi-phase fluid;
    a foam conduit in fluid communication with the nonlinear fluid conduits and the gas conduit to receive the bi-phase fluid therein;
    a first sensor disposed to measure at least one of a density and a flow rate of the base fluid in the common and nonlinear fluid conduit;

a second sensor disposed to measure a flow rate of the gas in the gas conduit;

a third sensor disposed to measure at least one of a pressure and a temperature of the bi-phase fluid in the foam conduit; and a processor in communication with at least one of the first sensor, the second sensor, and the third sensor, for determining a quality of the bi-phase fluid based upon the data.

12. The measurement system according to claim 11, wherein the first sensor is a coriolis flow meter.

13. The measurement system according to claim 11, wherein the second sensor is a turbine flow meter.

14. The measurement system according to claim 11, wherein the third sensor is a pressure transducer.

15. The measurement system according to claim 11, wherein the third sensor is a temperature sensor.

16. The measurement system according to claim 11, wherein at least one of a density, a quality, a rate, and a velocity of the bi-phase fluid is determined by the processor.

17. A method for monitoring a bi-phase fluid, comprising:

providing a base fluid through plurality of nonlinear fluid conduits connected upstream to a common fluid conduit;

providing a gas through a gas conduit in direct fluid communication with each of the nonlinear fluid conduits;

mixing a gas into the base fluid to form a bi-phase fluid;

providing a first sensor to measure a characteristic of the base fluid;

providing a second sensor to measure a characteristic of the gas;

providing a third sensor to measure at least one of a pressure and a temperature of the bi-phase fluid; and providing a processor to determined an unknown parameter of the bi-phase fluid based upon at least one of the characteristic of the base fluid, the characteristic of the gas, and the characteristic of the bi-phase fluid;

wherein the parameter is a quality of the bi-phase fluid.

18. The method according to claim 17, wherein the characteristic of the base fluid measured by the first sensor is at least one of a density and a flow rate of the base fluid.

19. The method according to claim 17, wherein the characteristic of the gas measured by the second sensor is a flow rate of the gas.

20. The method according to claim 17, wherein the parameter determined by the processor is at least one of a density, a flow rate, and a velocity of the bi-phase fluid.

* * * * *